(12) United States Patent
Li et al.

(10) Patent No.: US 10,684,865 B2
(45) Date of Patent: Jun. 16, 2020

(54) ACCESS ISOLATION FOR MULTI-OPERATING SYSTEM DEVICES

(71) Applicant: Intel Corporation, Santa Clara, CA (US)

(72) Inventors: Kevin Y. Li, Shanghai (CN); Vincent J. Zimmer, Federal Way, WA (US); Xiaohu Zhou, Shanghai (CN); Ping Wu, Shanghai (CN); Zijian You, Shanghai (CN); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/410,252

(22) Filed: May 13, 2019

(65) Prior Publication Data

US 2019/0278611 A1    Sep. 12, 2019

Related U.S. Application Data

(63) Continuation of application No. 14/772,605, filed as application No. PCT/CN2014/073691 on Mar. 19, 2014, now Pat. No. 10,289,425.

(51) Int. Cl.
*G06F 21/74* (2013.01)
*G06F 9/4401* (2018.01)
(Continued)

(52) U.S. Cl.
CPC .......... *G06F 9/441* (2013.01); *G06F 9/45541* (2013.01); *G06F 21/74* (2013.01); *H04L 9/0822* (2013.01)

(58) Field of Classification Search
CPC ................................ G06F 9/441; G06F 21/74
See application file for complete search history.

(56) References Cited

U.S. PATENT DOCUMENTS 10,289,425 B2 *   5/2019   Li .................. G06F 9/45541
2003/0115443 A1    6/2003   Cepulis et al.
(Continued)

FOREIGN PATENT DOCUMENTS

WO    2013026662 A1    2/2013

OTHER PUBLICATIONS

Office Action issued in Chinese Application No. 201480076013.5, dated Dec. 6, 2019, 24 pages.
(Continued)

*Primary Examiner* — Thaddeus J Plecha
(74) *Attorney, Agent, or Firm* — Grossman, Tucker, Perreault & Pfleger, PLLC

(57) ABSTRACT

The present application is directed to access isolation for multi-operating system devices. In general, a device may be configured using firmware to accommodate more than one operating system (OS) operating concurrently on the device or to transition from one OS to another. An access isolation module (AIM) in the firmware may determine a device equipment configuration and may partition the equipment for use by multiple operating systems. The AIM may disable OS-based equipment sensing and may allocate at least a portion of the equipment to each OS using customized tables. When transitioning between operating systems, the AIM may help to ensure that information from one OS is not accessible to others. For example, the AIM may detect when a foreground OS is to be replaced by a background OS, and may protect (e.g., lockout or encrypt) the files of the foreground OS prior to the background OS becoming active.

26 Claims, 9 Drawing Sheets

(51) Int. Cl.
    *G06F 9/455*    (2018.01)
    *H04L 9/08*     (2006.01)

(56) References Cited

U.S. PATENT DOCUMENTS

| | | |
|---|---|---|
| 2007/0156940 A1 | 7/2007 | Zmudzinski et al. |
| 2007/0239965 A1* | 10/2007 | Lewites .................. G06F 9/544 |
| | | 712/13 |
| 2011/0153872 A1* | 6/2011 | Nath ........................ G06F 9/455 |
| | | 710/10 |
| 2012/0137118 A1* | 5/2012 | Francois ............. G06F 9/44505 |
| | | 713/100 |
| 2012/0297177 A1 | 11/2012 | Ghosh et al. |

OTHER PUBLICATIONS

Examination Report issued in European Application No. 14886149.5, dated Jun. 22, 2018, 3 pages.
Office Action issued in Chinese Application No. 201480076013.5, dated Aug. 8, 2019, 7 pages.
Office Action issued in Chinese Application No. 201480076013.5, dated Mar. 16, 2020.

* cited by examiner

Example – Equipment Isolation Via Selective Equipment Reporting 400

ACCESS ISOLATION FOR MULTI-OPERATING SYSTEM DEVICES

TECHNICAL FIELD

The present disclosure relates to electronic devices, and more particularly, to a device for managing the concurrent operation and/or switching behavior of a plurality of operating systems.

BACKGROUND

A device may comprise an operating system (OS) to facilitate the operation of equipment in the device. For example, an OS may comprise various drivers for the equipment, file handling and processing utilities, user interface software that may facilitate user interaction with a device, etc. Devices have traditionally only comprised one OS as this is all that is needed for the device to function. However, the introduction of a variety of different types of operating systems from a variety of sources has generated interest in multi-operating system devices. For example, a user of a mobile computing device may desire to employ a more robust OS when the device is being used in a stationary manner (e.g., with external power and a wired network), and may switch to an OS that more streamlined, power efficient, etc. when the device is mobile. Alternatively, the increase in interest in "cloud" computing solutions (e.g., at least one device capable of providing services such as remote processing, remote storage, etc.) has created the need to be able to break down devices into smaller units of computing for scalable processing solutions. In either case, the ability to run multiple operating systems individually or concurrently is a desirable ability.

While employing more than one OS in a device may be beneficial on its face, the actual implementation of such a system is currently problematic. Existing solutions do not allow for transitioning from one OS to another in an expedient manner or for running multiple operating systems concurrently. Instead, a device may only run one OS at a time, may need to be rebooted to change OS configuration, etc. The resulting delays and/or undesirable operational limitations may make the use of more than one OS burdensome. It may also be possible for an instance of one operating system to run virtually within another OS, thereby allowing more than one OS to be concurrently active in a device. While such a solution may provide the flexibility to run more than one OS at the same time or to move quickly between different operating systems, the processing and/or power resources needed to implement this solution so that each OS performs in an acceptable manner does not make it appropriate for certain implementations wherein, for example, processing power and/or battery life are a concern (e.g., mobile communication and/or computing devices), where the desire is to subdivide equipment in a device to provide adequate resources, security and/or stability for a plurality of operating systems running concurrently, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
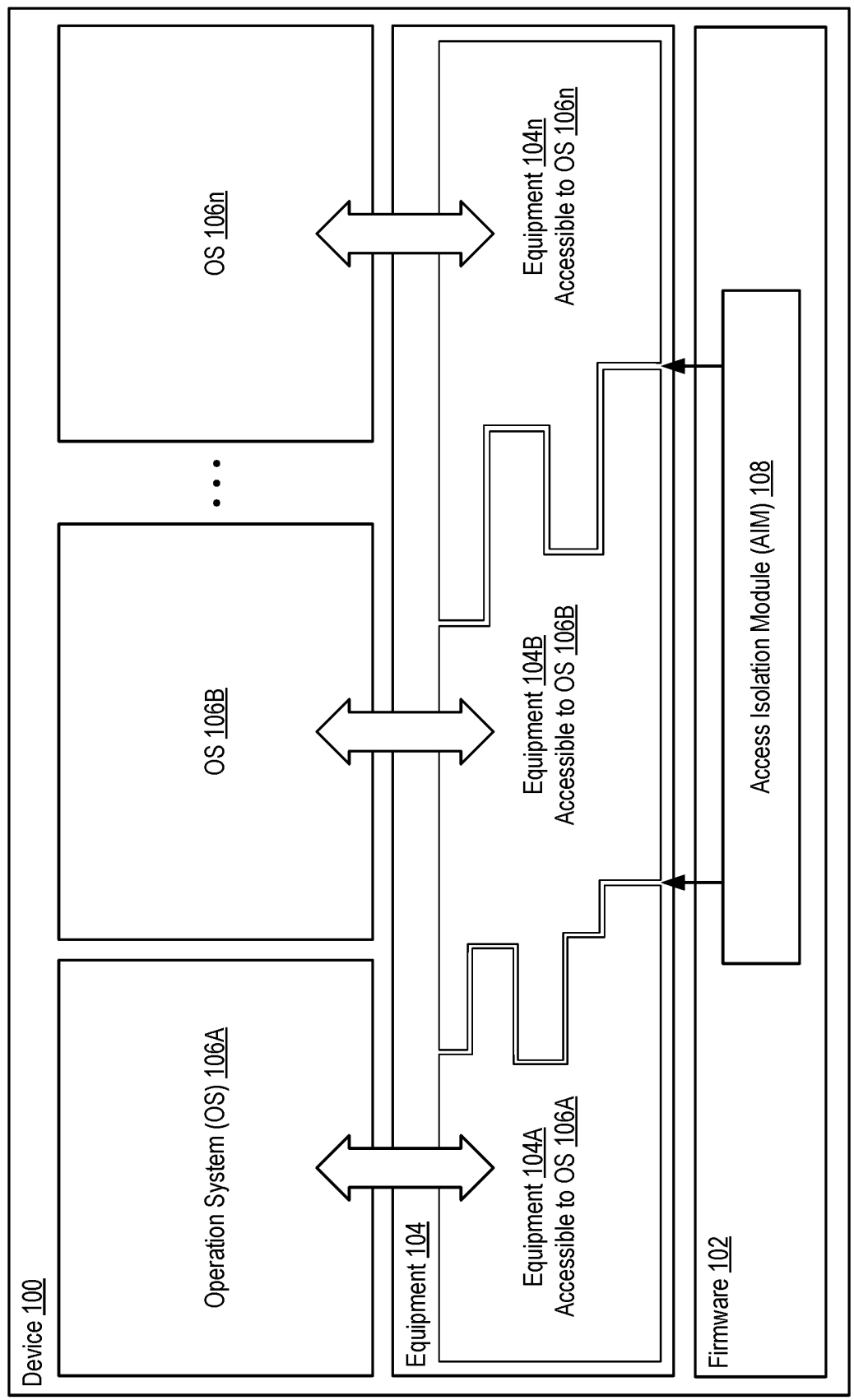
FIG. 1 illustrates an example device configured for access isolation for multi-operating system devices in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present application is directed to access isolation for multi-operating system devices. In general, a device may be configured using firmware (e.g., program code in persistent memory) to accommodate more than one operating system (OS) operating concurrently on the device or to transition from one OS to another. In one embodiment, an access isolation module (AIM) in the firmware may determine a device equipment configuration following device activation, and may then partition the equipment for use by multiple operating systems. The AIM may then disable equipment sensing services and may allocate at least a portion of the equipment to each OS using customized tables. When transitioning between operating systems, the AIM may help to ensure that information corresponding to one OS is not accessible to others. For example, the AIM may detect when a foreground OS is to be replaced by a background OS and may protect the files of the foreground OS prior to the background OS becoming active. Examples of protection may include locking out the memory used by the background OS so that it is inaccessible to the background OS, encrypting the memory used by the foreground OS before the background OS becomes active, etc. Encryption may involve the storage of keys in a secure memory to protect the keys from being accessed by harmful programs (e.g., malware) active in an OS.

In one embodiment, a multi-operating system device may comprise, for example, equipment, at least two operating systems and firmware. The equipment may be to support operations in the device. The at least two operating systems may be to interact with at least a portion of the equipment. The firmware may include at least an AIM to determine the portion of the equipment in the device that is accessible to each of the at least two operating systems.

For example, the AIM being to determine the portion of the equipment may comprise the AIM being to, following activation of the device, partition the equipment into portions accessible by the at least two operating systems. The AIM being to determine the portion of the equipment may comprise the AIM being to deactivate functionality in the firmware allowing the at least two operating systems to discover the equipment. In addition, the AIM being to determine the portion of the equipment may further comprise the AIM being to generate tables corresponding to each of the at least two operating systems, the tables including at least the identification of a portion of the equipment accessible to each of the at least two operating systems following activation of the device. The at least two operating systems may then be to load into the device and operate concurrently utilizing the portions of the equipment identified by the tables.

In one embodiment, the equipment may comprise at least a memory module including memory in which data corresponding to the at least two operating systems is stored. The at least two operating systems may comprise a foreground operating system and a background operating system, the access isolation module being further to detect a trigger to transition from the foreground operating system to the background operating system. The AIM may be further to, upon detecting the trigger, determine a portion of the memory utilized by the foreground operating system and to make the portion of memory determined to be utilized by the foreground operating system inaccessible to the background operating system. The AIM being to make the portion of memory determined to be utilized by the foreground operating system inaccessible to the background operating system may comprise the AIM being to at least one of adjust or lock down memory controller register settings to prevent any access to the portion of memory. The AIM being to make the portion of memory determined to be utilized by the foreground operating system inaccessible to the background operating system may comprise the AIM being to generate an encryption key, use the key to encrypt the portion of memory utilized by the foreground operating system and to store the key in a secure memory in the equipment. Moreover, the AIM may further be to obtain a second encryption key from the secure memory, to use the second key to decrypt a portion of memory utilized by the background operating system and to cause the foreground operating system to be replaced by the background operating system.

A method for accommodating multiple operating systems on a device consistent with the present disclosure may include, for example, detecting an event requiring firmware intervention in a device, determining equipment existing in the device, determining a relationship between the equipment and at least two operating systems existing in the device and isolating at least a portion of the equipment for use by each of the at least two operating systems.

Detecting the event may comprise, for example, at least one of detecting activation of the device or a trigger to transition from a foreground operating system to a background operating system in the device. Determining the equipment in the device may comprise partitioning the equipment into portions accessible by the at least two operating systems. In one embodiment, determining a relationship between the equipment and at least two operating systems may comprise deactivating functionality in the firmware allowing the at least two operating systems to discover the equipment and generating tables corresponding to each of the at least two operating systems, the tables including at least the identification of a portion of the equipment accessible by each of the at least two operating systems following activation of the device. Isolating at least a portion of the equipment for use by each of the at least two operating systems may comprise allowing the at least two operating systems to load into the device and operate concurrently utilizing portions of the equipment identified by the tables. In another embodiment, determining a relationship between the equipment and at least two operating systems may comprise determining a portion of the memory utilized by at least the foreground operating system. Isolating at least a portion of the equipment for use by each of the at least two operating systems may comprise, prior to the transition, making the portion of the memory utilized by at least the foreground operating system inaccessible to the background operating system by at least one of adjusting or locking down memory controller register settings, or by encrypting the portion of memory utilized by the foreground operating system. In the same or a different embodiment, at least one machine-readable storage medium having stored thereon, individually or in combination, instructions that when executed by one or more processors result in the following operations for accommodating multiple operating systems on a device may comprising detecting an event requiring firmware intervention in a device, determining equipment existing in the device, determining a relationship between the equipment and at least two operating systems existing in the device and isolating at least a portion of the equipment for use by each of the at least two operating systems. The medium embodiment may further comprise example features similar to the method embodiment.

FIG. 1 illustrates an example device configured for access isolation for multi-operating system devices in accordance with at least one embodiment of the present disclosure. Examples of device 100 may comprise, but are not limited to, a mobile communication device such as a cellular handset or a smartphone based on the Android® OS, IOS®, Windows® OS, Mac OS, Tizen OS, Firefox OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a server, a smart television, small form factor computing solutions (e.g., for space-limited applications, TV set-top boxes, etc.) like the Next Unit of Computing (NUC) platform from the Intel Corporation, etc. Device 100 may comprise, for example, at least firmware 102, equipment 104 and a plurality of operating systems such as OS 106A, OS 106B . . . OS 106n (collectively, "OS 106A . . . n"). While only three (3) OS 106A . . . n are illustrated in device 100, embodiments consistent with the present disclosure are not limited to merely three operating systems, and may include less or more depending on, for example, the capabilities of device 100.

Firmware 102 may comprise, for example, software code, programs, data, etc. stored in non-volatile (NV) memory in device 100. For example, a read-only memory (ROM) may be encoded with information that is loaded into memory when device 100 is activated (e.g., powered up from an unpowered state, rebooted from a powered state, etc.). The information loaded into the memory of device 100 may comprise, for example, at least one kernel to provide an interface between OS 106A . . . n and equipment 104, management programs such as a virtual machine manager (VMM) or "hypervisor" to manage the operation of at least one virtual machine (VM) within device 100, drivers, utilities, security programs, etc. The programs loaded by firmware 102 may be subjected to security verification, and thus, may operate at a higher privilege level than other software in device 100 (e.g., OS 106A . . . n). At least one program loaded by firmware 102 may be AIM 108. In general, AIM 108 may facilitate the operation and interaction of OS 106A . . . n. AIM 108 may, for example, control how portions of equipment 104 may be accessed by each OS 106A . . . n. Example activities that may be performed by AIM 108 will be discussed in regard to FIG. 3-9.

Equipment 104 may comprise hardware within device 100, or at least coupled to device 100, that may support and/or facilitate various operations. Equipment 104 may include systems more core to the operation of device 100 (e.g., processors, memory, bus interfaces, input/output (I/O), etc.) as well as peripheral systems such as user interface hardware, wired and/or wireless hardware for external communication, etc. In one embodiment, AIM 108 may isolate at least one portion of equipment 104 such as, for example, equipment 104A accessible to OS 106A, equipment 104B accessible to OS 106B . . . equipment 104n accessible to OS 106n (collectively "equipment 104A . . . n"). Isolation, as referenced herein, indicates that programmatic controls may be established that allow equipment 104A . . . n to be successfully accessed (e.g., data being read and/or written, commands being executed, etc.) only by the corresponding OS 106A . . . n. Access attempts by another OS 106A . . . n may result in at least one of the attempt being blocked, an error being generated or the return of incomprehensible data (e.g., due to data encryption).

OS 106A . . . n may comprise collections of software that may be configured to manage the operation of equipment 104 in device 100. OS 106A . . . n may be manufactured by a company for sale, may be compiled by a user community (e.g., "open-source") for free use, or may be hybrids of the private/public models. Examples of OS 106A . . . n may include, but are not limited to, Disk Operating System (DOS), Windows, IOs, Android, Unix, Linux (e.g., including a variety of both public and for-profit distributions), Jolicloud, etc. OS 106A . . . n may be associated with at least one kernel. A kernel may comprise software resources that may act as an interface between OS 106A . . . n and equipment 104. For example, the kernel may comprise at least one driver that may be employed to operate equipment 104. During operation, OS 106A . . . n may make system calls to access various hardware resources in equipment 104. The kernel may manage these calls and allocate the calls to the appropriate hardware within equipment 104. OS 106A . . . n may operate singly (e.g., one at a time) or concurrently in device 100. Examples of both operational scenarios will be discussed in regard to FIGS. 3 to 9

Figure 2:
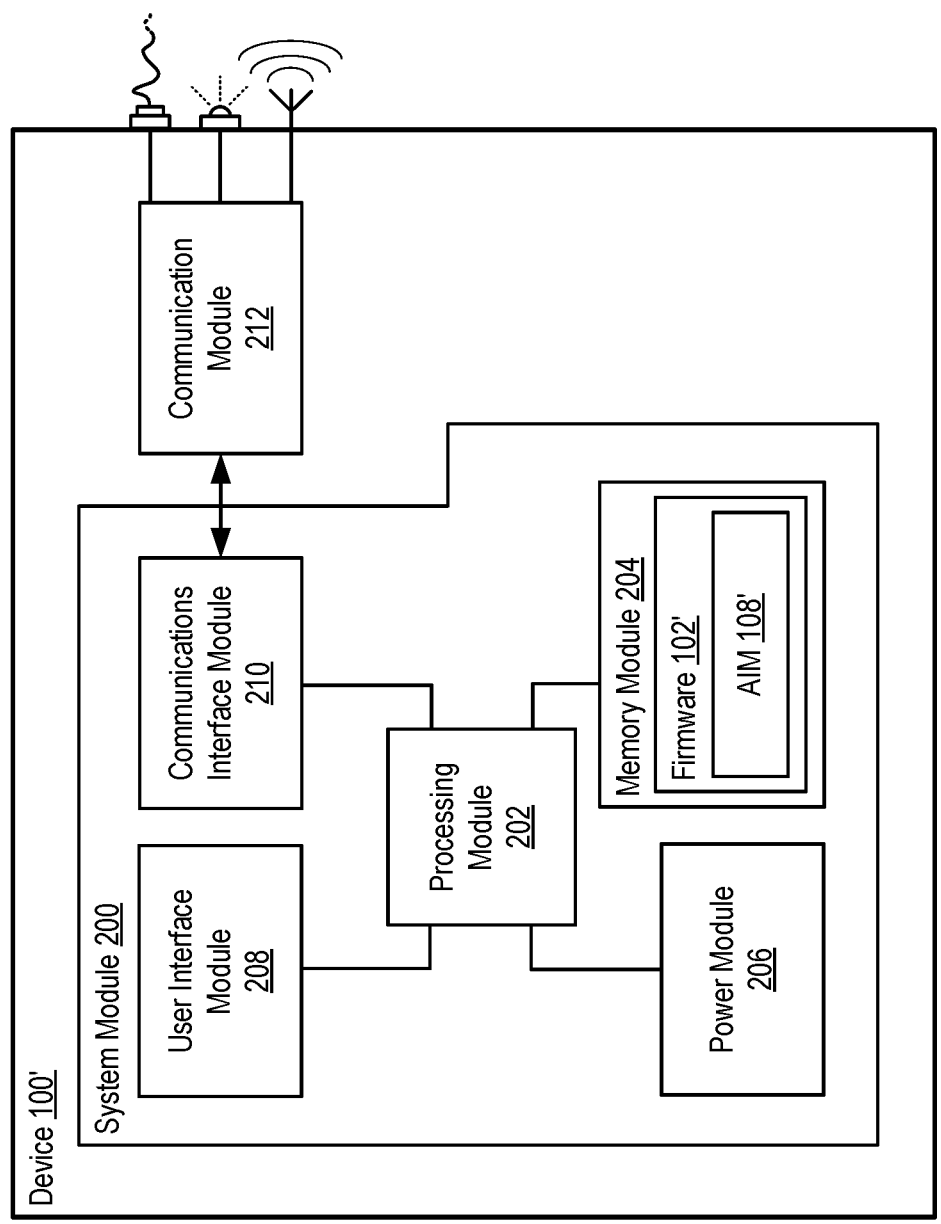
FIG. 2 illustrates an example configuration for a device usable in accordance with at least one embodiment of the present disclosure.

FIG. 2 illustrates an example configuration for device 100' usable in accordance with at least one embodiment of the present disclosure. In particular, device 100' may be capable of performing example functionality such as disclosed in FIG. 1. However, device 100' is meant only as an example of an apparatus usable in embodiments consistent with the present disclosure, and is not meant to limit these various embodiments to any particular manner of implementation.

Device 100' may comprise, for example, system module 200 configured to manage device operations. System module 200 may include, for example, processing module 202, memory module 204, power module 206, user interface module 208 and communication interface module 210. Device 100' may also include communication module 212. While communication module 212 has been illustrated as separate from system module 200, the example implementation shown in FIG. 2 has been provided merely for the sake of explanation. It is also possible for some or all of the functionality associated with communication module 212 to be incorporated into system module 200.

In device 100', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or ROM in a fixed or removable format. RAM may include volatile memory configured to hold information during the operation of device 100' such as, for example, static RAM (SRAM) or Dynamic RAM (DRAM). ROM may include NV memory modules configured using a Basic Input/Output System (BIOS), Unified Extensible Firmware Interface (UEFI), etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply device 100' with the power needed to operate. User interface module 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The hardware in user interface module 208 may be incorporated within device 100' and/or may be coupled to device 100' via a wired or wireless communication medium.

Communication interface module 210 may be configured to manage packet routing and other control functions for communication module 212, which may include resources configured to support wired and/or wireless communications. In some instances, device 100' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

In the example disclosed in FIG. 2, memory module 204 may comprise firmware 102' (e.g., stored in NV memory within memory module 204), which may include AIM 108'. In an example of operation, firmware 102' may comprise information that may be loaded into RAM memory upon the activation of device 100'. The loading of this information may comprise a verification (e.g., measurement) to ensure that malware is not being loaded. AIM 108' may be part of the information that is loaded into RAM and may monitor operations in device 100' for events related to OS 106A . . . n. Example events may include the activation of device 100', the loading of OS 106A . . . n into device 100, a trigger to transition from a foreground OS 106A . . . n to a background OS 106A . . . n, etc. Upon sensing an event, AIM 108' may perform operations related to the isolation of at least a portion of equipment 104 including, for example, equipment associated with modules 200 to 212 as disclosed in FIG. 2.

Figure 3:
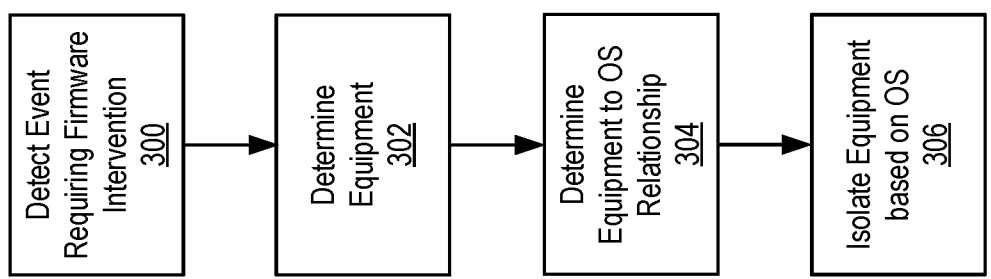
FIG. 3 illustrates example operations for access isolation for multi-operating system devices in accordance with at least one embodiment of the present disclosure.

FIG. 3 illustrates example operations for access isolation for multi-operating system devices in accordance with at least one embodiment of the present disclosure. The example operations disclosed in FIG. 3 may serve as a basic framework on which various embodiments consistent with the present disclosure may be based. In operation 300 an event requiring intervention by firmware 102 (e.g., by AIM 108) in device 100 may be detected. Examples of events may include the activation of device 100, a trigger to transition from a foreground OS 106A . . . n to a background OS 106A . . . n, etc. Equipment 104 in device 100 may then be determined in operation 302. Determining equipment 104 may include, for example, discovering hardware incorporated within and/or coupled to device 100. After equipment 104 has been determined in operation 302, then in operation 304 the relationship of equipment 104 to OS 106A . . . n may be determined. For example, in operation 304 at least one portion of equipment 104 may be associated with each OS 106A . . . n. This association may be made on a prospective basis (e.g., during initialization of device 100, but prior to the loading of OS 106A . . . n) or on a reflective basis (e.g., based on resources in device 100 that were actually used by OS 106A . . . n). The association allows for at least one portion of equipment 104 to be isolated in operation 306. For example, portions of equipment 104 may be isolated so that each operating system may have access to a set of equipment 104 without concern over interference from another OS 106A . . . n.

Figure 4:
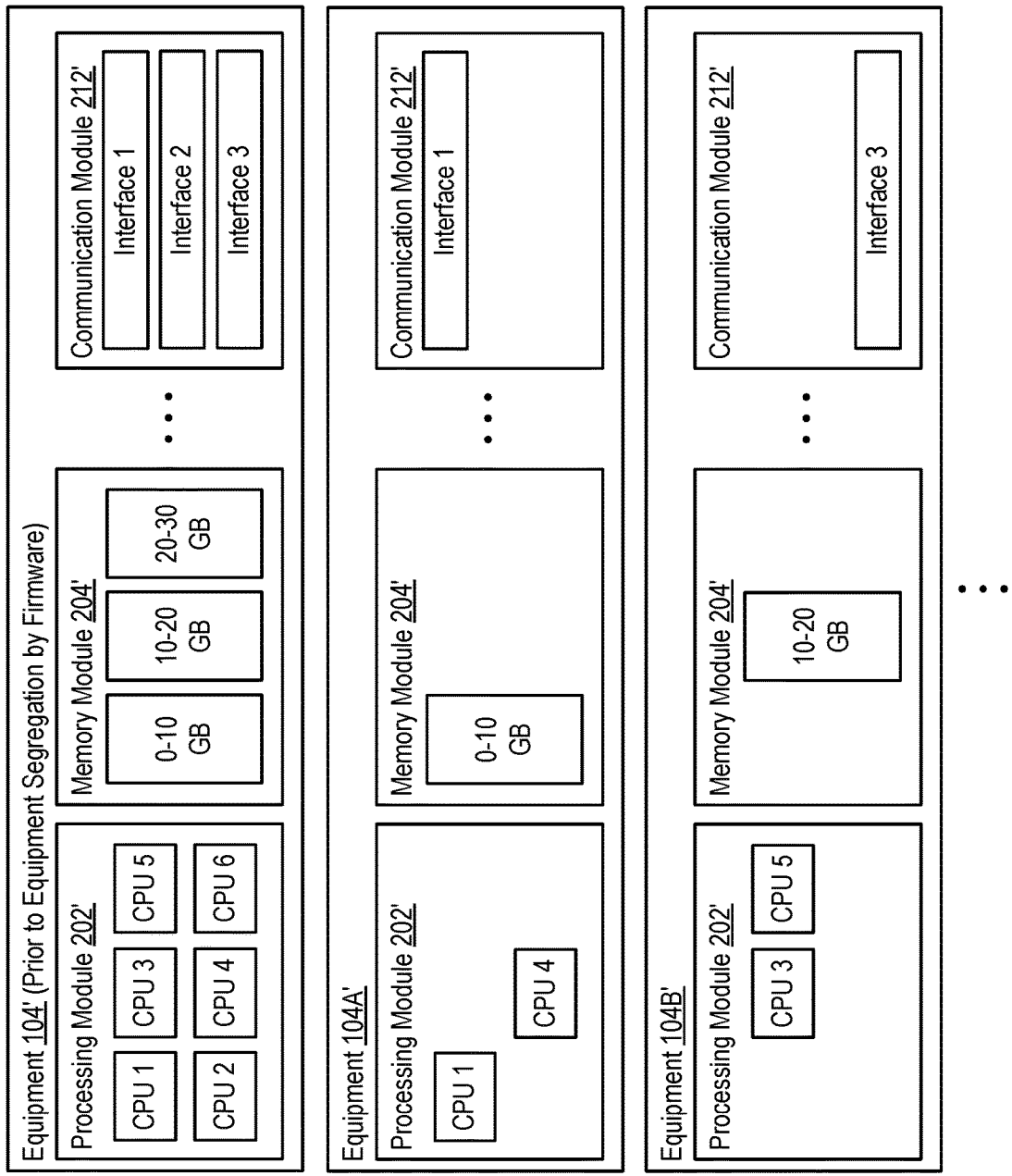
FIG. 4 illustrates an example of equipment isolation via selective equipment reporting in accordance with at least one embodiment of the present disclosure.

FIG. 4 illustrates an example of equipment isolation via selective equipment reporting in accordance with at least one embodiment of the present disclosure. In operational scenarios like cloud computing, device 100 may be a stationary computing device such as a server comprising substantial resources. For example, a single device 100 may comprise a plurality of processors each including a plurality of cores, a plurality of mass data storage components, a large amount of RAM memory, etc., resulting in more computing power than may be effectively utilized by a single OS 106A . . . n. As a result, there is a desire to be able to flexibly partition device 100 in smaller computing units. Given the cloud computing scenario, the ability to flexibly apportion equipment 104 to different OS 106A . . . n that may operate concurrently on device 100 would allow a cloud resource provider to carve out the processing, storage, etc. resources needed by a cloud user without the added overhead of a software based OS-in-OS or virtualization solution. This type of flexibility may provide the modularity needed to implement rack-scale architecture (RSA) computing wherein entire racks of individual servers may share resources such as power, cooling, processing, memory, etc. to increase efficiency, reduce heat generation, etc.

In one example implementation, Advanced Configuration and Power Interface (ACPI) hardware enumeration available in UEFI-based firmware 102 may be employed to implement hardware isolation wherein the manner in which equipment 104A . . . n is allocated to OS 106 A . . . n may be controlled. This is because ACPI declares elements of system topology that are not software-discoverable. This functionality along with the UEFI GetMemoryMap operation may allow devices to be selectively assigned and communicated to each OS 106A . . . n. In one embodiment, the peripheral component interconnect (PCI) configuration space, which allows OS 106A . . . n to perform auto configuration of equipment plugged into PCI slots, must be disabled so that the segregation of equipment 104 to portions of equipment 104A . . . n cannot be overridden.

An example of equipment isolation via selective equipment reported is disclosed at 400 in FIG. 4. Equipment 104' discloses an example hardware configuration for device 100. For example, processing module 202' may comprise a plurality of processors CPU1, CPU2, CPU3 CPU4 and CPU5 (collectively, "CPU 1 . . . 5"). Memory module 204' may comprise 30 GB of physical RAM memory that may be divided into 10 GB sections. Communication module 212' may comprise a plurality of wired or wireless interfaces including interface 1, interface 2 and interface 3 (collective, "interface 1 . . . 5"). It is important to note that equipment 104' may include other divisible hardware, such as each CPU 1 . . . 5 comprising a plurality of divisible processing cores. The configuration of equipment 104' has been presented merely for explanation herein.

Equipment 104A' and 104B' represent how equipment 104' may be partitioned to form a plurality of logical devices within a single physical device 100. For example, equipment 104A' may be reported to OS 106A and may comprise only CPU 1 and CPU4, the first 10 GB of RAM memory and communication interface 1. Thus, OS 106A may operate on device 100 within the bounds of a logical device defined by the resources identified in equipment 104A'. Similarly, equipment 104B' may be reported to OS 106B. As a result, OS 106B may operate within the bounds of a logical device comprises CPU3 and CPU 5, the second 10 GB of RAM memory and communication interface 3. A portion of equipment 104A . . . n may likewise be defined for every subsequent OS 106A . . . n. In this manner, more than one OS 106A . . . n may operate concurrently on device 100 without interference since no OS 106A . . . n is utilizing the same hardware within equipment 104 (e.g., each OS 106A . . . n utilizes different equipment 104A . . . n). Operating in this manner allows all of equipment 104 to be accessed, especially where a single OS 106A . . . n does not have the ability to access all of equipment 104 in large devices 100 (e.g., cloud servers).

Figure 5:
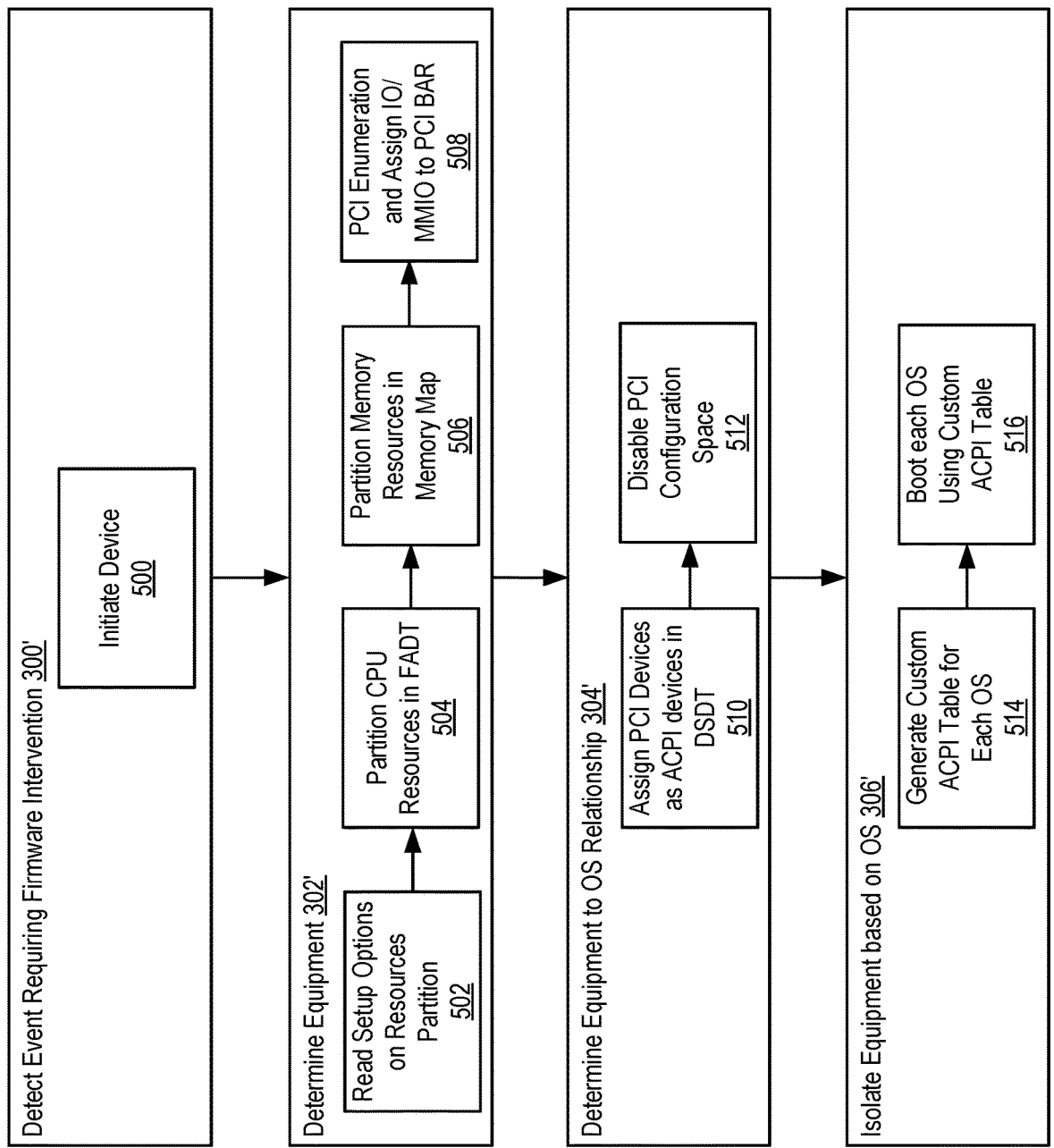
FIG. 5 illustrates example operations for equipment isolation via selective equipment reporting in accordance with at least one embodiment of the present disclosure.

FIG. 5 illustrates example operations for equipment isolation via selective equipment reporting in accordance with at least one embodiment of the present disclosure. The example disclosed in FIG. 5 further modifies the operations presented in FIG. 3 by present more specific examples of operations that may occur in accordance with the example presented in FIG. 4. In operation 300' the event that may be detected is the initialization (or re-initialization) of device 100 (operation 500). Determining equipment 103 in operation 302' may comprise, for example, reading setup options on a resources partition in device 100 (operation 502). The setup options may specify general equipment configuration criteria for device 100, which may be employed in operation 504 to partition the CPU resources (e.g., processors and/or cores) in a fixed ACPI description table (FADT). For example, each entry in the FADT may define a logical CPU resource with a unique advanced programmable interrupt controller identification (APIC ID). In operation 506 memory resources in equipment 104 may be partitioned in a memory map. Using UEFI as an example, the EFI_MEMORY_MAP may be employed to pass memory configuration information to an OS 106A . . . n. Memory partitioning may be followed by EFI device enumeration and assigning I/O and memory-mapped I/O (MMIO) to at least one PCI base address register (BAR) in operation 508.

Following the determination of equipment 104 in operation 302', the relationship of equipment 104 to OS 106A . . . n may be determined in operation 304'. For example, in operation 510 PCI devices may be assigned as ACPI devices in a differentiated system description table (DSDT). For example, in addition to reporting processing and memory resources, equipment 104 may also be reported as an ACPI device to an OS 106A . . . n using the DSDT name space (e.g., ACPI timer, ACPI power button, etc.) Consistent with the present disclosure, the DSDT resource reporting mechanism may also be employed to report PCI devices as ACPI devices (e.g., to prevent the PCI devices from being automatically configurable by OS 106A . . . n), and may use the _CRS method (e.g., an ACPI macro to add connection resources to their resource methods) to report the IO/MMIO BAR resources. Example code for enumerating a PCI device in an ACPI table may comprise:

```
OperationRegion(BAR0, SystemMemory, 0xC8000000, 0x20000)
OperationRegion(BAR1, SystemIo, 0x8000, 0x20)
Device(B1D2)
{
Name (_HID, "80860003") // PCI-assigned device identifier
Method(_CRS, 0x0, NotSerialized)
{
......................
Return BAR0;
......................
Return BAR1;
..............................
}
```

Following the PCI devices being reported as ACPI devices in operation 510, the PCI configuration space may be disabled in operation 512 to prevent OS 106A . . . n from being able to automatically discover PCI devices in equipment 104. Equipment 104 may then be isolated into portions of equipment 104A . . . n in operation 306' wherein, for example, custom ACPI tables may be generated for each OS 106A . . . n in operation 514. The resources identified in each ACPI table may be determined in a variety of manners including, for example, manual configuration by a system operator (e.g., via a user interface in firmware 102 or in an OS 106A . . . n), automatically by AIM 108 or another system in device 100, automatically in firmware 102 by a control system existing outside of device 100, etc. OS 106A . . . n may then be allowed to boot in operation 516. Each OS 106A . . . n may use a corresponding custom ACPI table that was generated in operation 514, the custom ACPI tables describing a portion of equipment 104A . . . n that each OS 106A . . . n is allowed to access during operation. In this manner, more than one OS 106A . . . n may operate concurrently in device 100 without interfering with each other since the portions of equipment 104 A . . . n that may be accessed by each OS 160A . . . n may be isolated (e.g., may not overlap).

In one embodiment, interrupt delivery may be modified to accommodate the concurrent operation of a plurality of OS 106A . . . n in a plurality of logical devices defined by ACPI tables. For interrupt delivery in existing systems there may be multiple interrupt sources and interrupt controllers. Consistent with the present disclosure, an interrupt controller may be assigned to different portions of equipment 104A . . . n to ensure that each logical device uses the interrupt mechanism properly. Since each CPU may comprise a local APCI timer, it may be possible to ensure that each logical device has a timer interrupt for OS task scheduling. In one example implementation, one logical device may access user interface module 208 (e.g., display, user inputs, etc.) while the others may be headless (e.g., with no user interface ability on device 100). However, if equipment 104 comprises has two graphic controllers, it may be possible to give more than one logical device user interface abilities, which should improve user experience.

Figure 6:
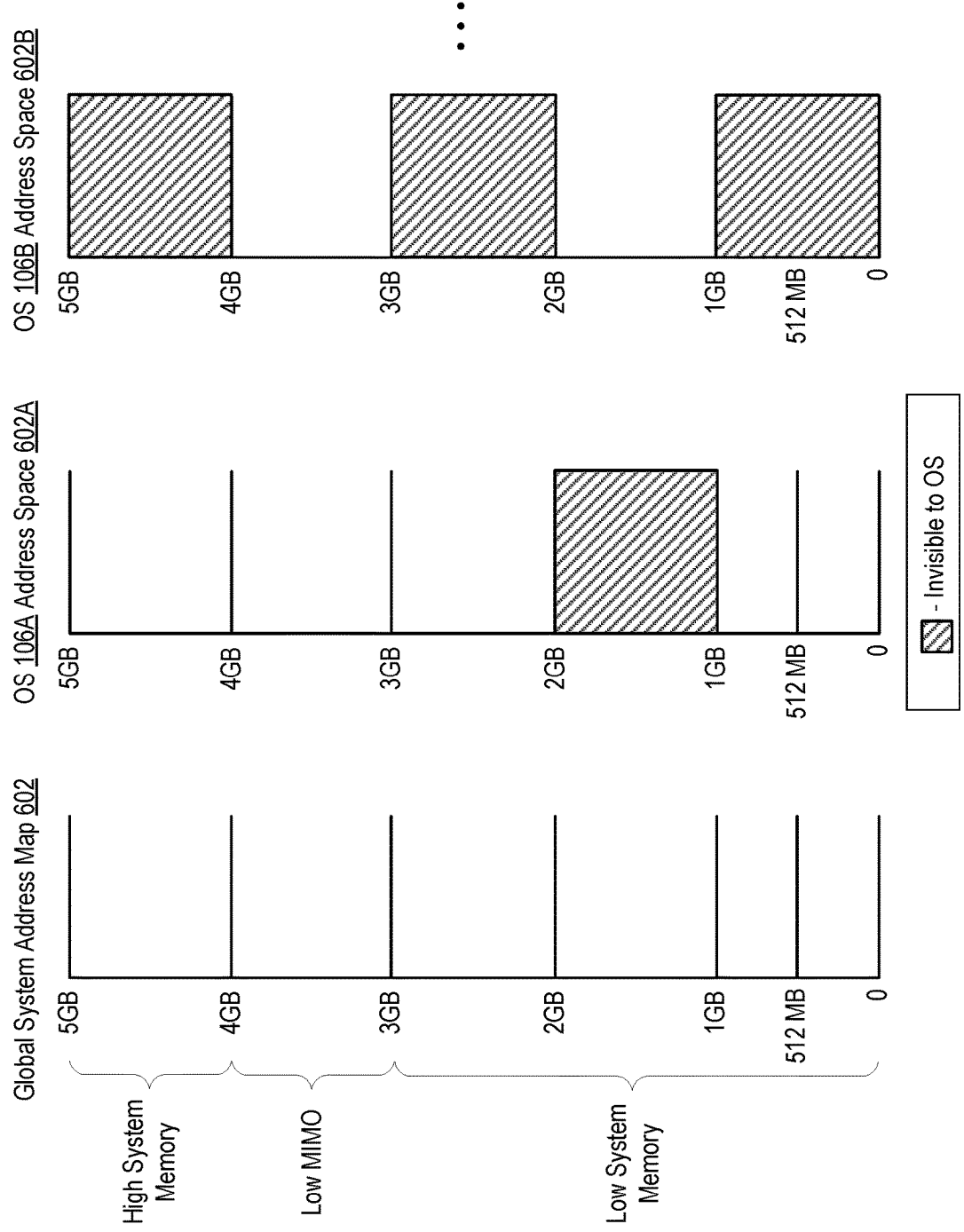
FIG. 6 illustrates an example of equipment isolation via memory lockout in accordance with at least one embodiment of the present disclosure.

FIG. 6 illustrates an example of equipment isolation via memory lockout in accordance with at least one embodiment of the present disclosure. While the example of FIG. 5 disclosed the concurrent operation of OS 106A . . . n on device 100, the embodiments disclosed in FIG. 6 and FIG. 8 deal with transitioning between different OS 106A . . . n in device 100. For example, device 100 may comprise at least a foreground OS (e.g., OS 106A) and a background OS (e.g., OS 106B). Existing multi-OS solutions employ configuring firmware 102 for dual-booting or executing instances of OS 106A . . . n inside of each other. Both of these options are problematic. Dual-booting requires the restart device 100 to transition between OS 106A and 106B. The need to reboot is time consuming and negatively impacts user experience. Running instances of OS 106A . . . n inside of each other is a more responsive solution, but creates a great deal of memory and processing overhead that may slow down overall system performance. Consistent with the present disclosure, embodiments are presented in FIG. 6-8 that may facilitate quick switching between OS 106A . . . n without placing a substantial burden on the resources of device 100.

The ACPI standard defines four global (Gx) states and six sleep (Sx) states. The sleep states S0 to S5 define different levels of activity in device 100. For example, The S0 state may describe when device 100 is fully active, while the S5 state is when device 100 is in a "soft off" state wherein device 100 is totally inactive except for power still being supplied. Of all of these various sleep states, the S3 or "standby" state is of interest in that activity in device 100 may be suspended while the RAM memory is preserved. Upon entry into the S4 or "hibernation" state the current state of the RAM is saved to disk. It may be advantageous to place device 100 into the S3 state when switching from one OS to another in that the RAM state is preserved for both foreground OS 106A and background OS 106B, allowing quick transitions from one to the other without having to load the RAM state from disk (e.g., as occurs in the S4 hibernation state). Such functionality may be added to UEFI based firmware 102 to allow device 100 to, upon the occurrence of a triggering event, cause the device to enter the S3 sleep state and, upon resuming from the S3 sleep state, transition from foreground OS 106A to background OS 106B. To the user the transition may seem to occur almost immediately, greatly enhancing user satisfaction.

However, the benefit of transitioning between OS 106A . . . n in this manner may also be a liability. Transitions in the S3 sleep state may occur quickly because both foreground OS 106A and background OS 106B may be maintained in RAM memory. However, this also means that the information stored in memory from foreground OS 106A is vulnerable to being accessed by background OS 106B, and vice versa. For example, malware in foreground OS 106A may be able to access data critical to the operation of background OS 106B, confidential information concerning device 100, concerning user(s) of device 100, etc. To address this vulnerability, it may be possible to leverage memory configuration (e.g., address mapping) mechanisms such as, for example, the source address decoder (SAD) and target address decode (TAD) mechanisms available in some microprocessor architectures (e.g., Intel Xeon microprocessors) as OS switch memory map registers. For example, the SAD and TAD registers may control the start and end of address ranges in the memory. A situation wherein, for example, the end address is less than the start address may indicate an invalid entry. It may also be possible to create custom registers (e.g., custom OS switch memory map registers) specifically for controlling memory accessibility during OS changeover. These memory configuration features may be used to modify the system memory addressable space to customize memory access based on whether foreground OS 106A or background OS 106B is active. As a result, foreground OS 106A would not be able to access areas of memory containing information corresponding to background OS 106B, and vice versa.

An example of equipment isolation via memory lockout is illustrated at 600 in FIG. 6. Example global system address map 602 discloses that device 100 comprises 5 GB of available memory, with one 0 to 3 GB being low system memory, 3 to 4 GB being low MIMO memory and 4 to 5 GB being high system memory. Examples 602A demonstrates how available memory may appear to foreground OS 106A, while example 602B demonstrates the memory that may be available to background OS 106B when active. In example 602A, system addressable memory space may be modified that show that the memory up to 1 GB and after 2 GB is accessible. The memory space between 1 GB and 2 GB may be reserved for, for example, background OS 106B. On the other hand, example 602 discloses that background OS 106B may only access memory between 1 and 2 GB as well as memory between 3 and 4 GB. In one embodiment, the memory in the 3 to 4 GB address range may map to equipment 102 (e.g., hardware devices) in device 100. Thus, the memory in the 3 to 4 GB address range may be used by both foreground OS 106A and background OS 106B to control equipment 102.

As shown in example 602A, the area of memory between 1 and 2 GB would not be visible to foreground OS 106A, and thus, there would be no reason for programs running in foreground OS 106A to attempt to access this region in memory. However, it may be possible for malware operating in foreground OS 106A to still attempt to access the blocked out area of memory based on assuming that, in view of the protection scheme, the memory may still exist in device 100. In one embodiment any attempt to access blocked out memory areas may trap bad actors by at least stopping the access. Moreover, an error may be generated notifying the system of the attempted access and/or some or all activity in OS 106A may be halted to prevent further access attempts.

Figure 7:
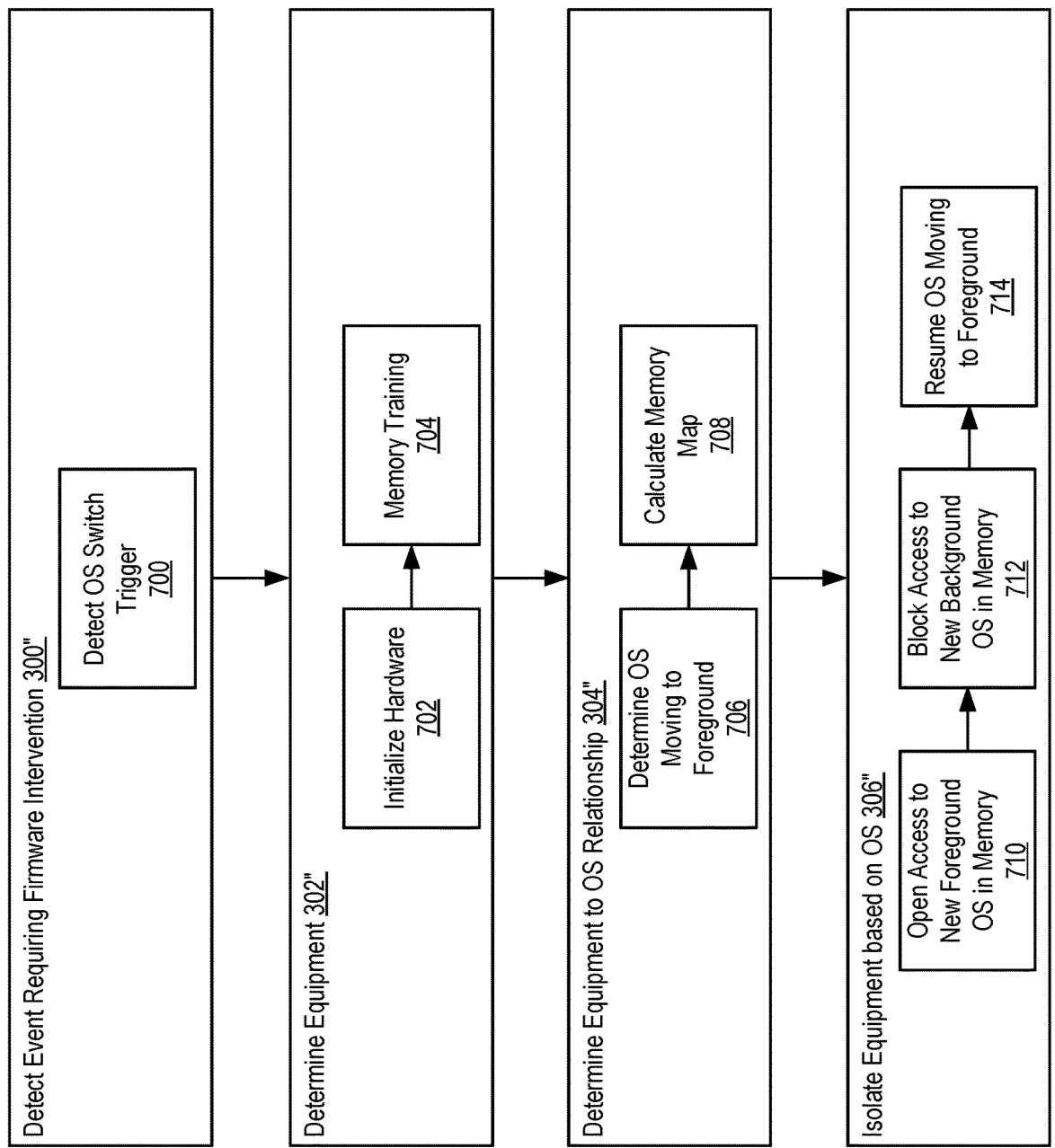
FIG. 7 illustrates example operations for equipment isolation via memory lockout in accordance with at least one embodiment of the present disclosure.

FIG. 7 illustrates example operations for equipment isolation via memory lockout in accordance with at least one embodiment of the present disclosure. Detecting an event requiring firmware intervention in operation 300″ may comprise detecting an OS switch trigger (operation 700). An example OS switch trigger may comprise a manual-initiated event (e.g., user interface interaction) or an automated event (e.g., from an application executing in the currently active OS 106A . . . n, device 100 entering S3 sleep state, etc.). User interface interaction may include, for example, the actuation of a hardware-based control (e.g., a hardware button) or software-based control (e.g., a button displayed in a graphical interface). Regardless of the OS switch trigger, device 100 may enter the S3 sleep state and upon resume may engage in determining equipment 302″. For example, in operation 702 the hardware (e.g., equipment 104) may be initialized. The hardware initialization may be followed by memory training in operation 704. Memory training may include, for example, firmware 102 (e.g., AIM 108) determining the entire memory address mapping (e.g., including SAD/TAD register settings and other related registers) for device 100 during device initialization. AIM 108 may then cause the memory mapping to be stored in NV memory (e.g., as a UEFI Variable), and may also record memory partition configuration, such as foreground OS 106A using 0~1 GB, 2~3 GB and 4~5 GB, while background OS 106B only using 1~2 GB memory. The memory map information saved in NV memory may then be used for a reference when, for example, transitioning from foreground OS 106A to background OS 106B.

Determining equipment to OS relationship in operation 304″ may comprise, for example, determining the OS 106A . . . n moving to the foreground (e.g., background OS 106B) in operation 706 and then calculating a memory map in operation 708. Determining the OS 106A . . . n moving to the foreground in operation 706 may be important in scenarios where, for example, device 100 may comprise more than two operating systems. Calculating the memory map may include, for example, at least determining register settings based on foreground OS 106A transitioning to the background and background OS 106B transitioning to the foreground. Thus, the new memory map may make areas in the memory corresponding to OS 106B accessible while making areas in the memory corresponding to OS 106A inaccessible. Isolating the equipment based on the OS transition in operation 306" may then comprise altering the memory configuration based on the memory map calculated in operation 708. For example, in operation 710 access may be opened to memory areas corresponding to the new foreground OS (e.g., OS 106B) while access may be blocked to the memory areas corresponding to OS 106A which will transition to the background in operation 712. The resumption of operations from the S3 sleep state in device 100 may then be completed in operation 714 wherein OS 106B becomes the new foreground OS.

Figure 8:
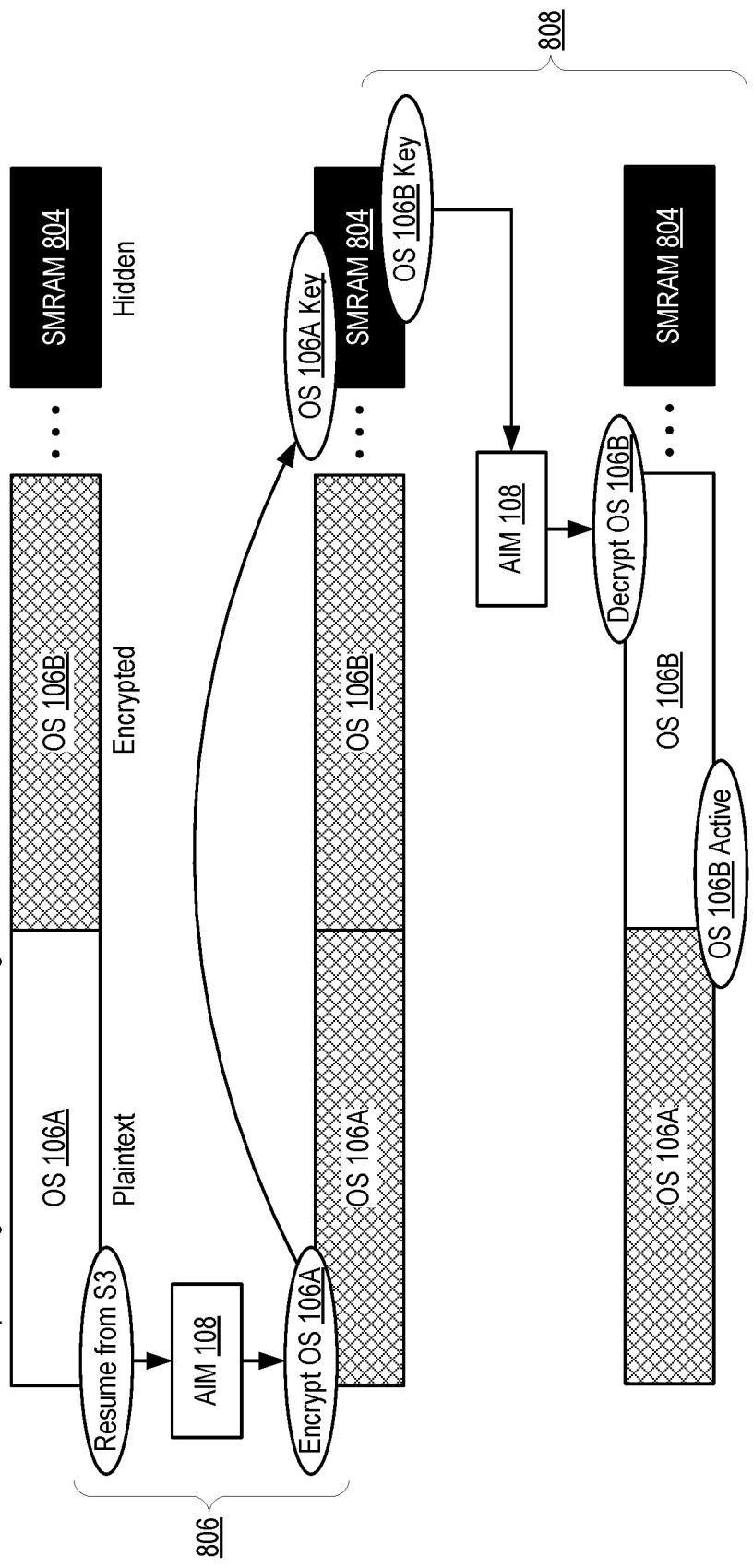
FIG. 8 illustrates an example of equipment isolation via memory encryption in accordance with at least one embodiment of the present disclosure.

FIG. 8 illustrates an example of equipment isolation via memory encryption in accordance with at least one embodiment of the present disclosure. Similar to the embodiment disclosed in FIGS. 6 and 7, FIGS. 8 and 9 also pertain to protecting regions of memory associated with an OS 106A . . . n from being accessed by another OS 106A . . . n. However, this embodiment presents a software-based encryption solution as opposed to a hardware-based lockout solution that controls for, example, the hardware memory decoding mechanism. While both solutions provide the same type of functionality, the hardware-based lockout solution may employ certain hardware configuration features that are currently available only in server class microprocessors. The microprocessors used in, for example, personal computers (PCs), tablet computers, mobile communication devices, etc. may not yet include these configuration features, and thus, FIGS. 8 and 9 presents an encryption solution that may be applicable to a wider variety of devices 100.

An example of equipment isolation via memory encryption is presented at 800. A basic memory configuration is shown at 802 and may include, for example, an area of memory used by OS 106A, an area of memory utilized by OS 106B and system management RAM (SMRAM) 804. SMRAM 804 may comprise, for example, secure memory only accessible to firmware 102 (e.g., AIM 108). An example of a transition from foreground OS 106A to background OS 106B is shown at 804. The initial state of the area of memory used by foreground OS 106A may be readable (e.g., in plaintext) while the area of memory used by background OS 106B may be encrypted. SMRAM 804 may be hidden (e.g., since it may only be accessed by AIM 108). The initial operations in the transition are shown at 806 wherein AIM 108 may, after device resumes from an S3 sleep state, cause the area of memory used by foreground OS 106A to become encrypted. For example, an Advanced Encryption Standard (AES) encryption algorithm may be employed with a Galois Counter Mode (GCM) cipher to encrypt and authenticate the areas of memory used by OS 106A and OS 106B. The performance of AES-CGM may be boosted by certain microprocessors (e.g., at least some microprocessors offered by the Intel Corporation) that comprise AES New Instruction set (AES-NI), along with the carry-less multiplication instruction (PCLMULQDQ), which may boost the overall performance of the AES-GCM algorithm.

Following encryption of the area of memory used by foreground OS 106A, the key used to perform the encryption may be stored in SMRAM 804 for safekeeping (e.g., since SMRAM 804 is only accessible to AIM 108). The operations shown at 808 in FIG. 8 may follow those that occur at 806 to decrypt the area of memory used by the OS moving to the foreground (e.g., OS 106B). For example, AIM 108 may retrieve the key that was utilized previously to encrypt the area of memory utilized by background OS 106B, and may then decrypt this area of memory as OS 106B transitions to the foreground. Decryption may include an authentication operation to ensure that the area of memory utilized by OS 106B has not been corrupted. For example, a program (e.g., malware) in foreground OS 106A may still write to the area of memory used by background OS 106B, and this write activity may insert data into the encrypted area of memory that could corrupt operation. Authentication helps to ensure that the decrypted area of memory matches that which was originally encrypted. If authentication fails the transition may be halted and foreground OS 106B may resume in the foreground. Providing authentication is successful, the memory may now be in a state wherein OS 106B, the new foreground OS, may freely access the area that includes its files while the area including data for OS 106A, now in the background, is encrypted. While encryption does not prevent the areas in memory corresponding to OS 106A from being accessed, any data returned from a read access attempt will be incomprehensible.

Figure 9:
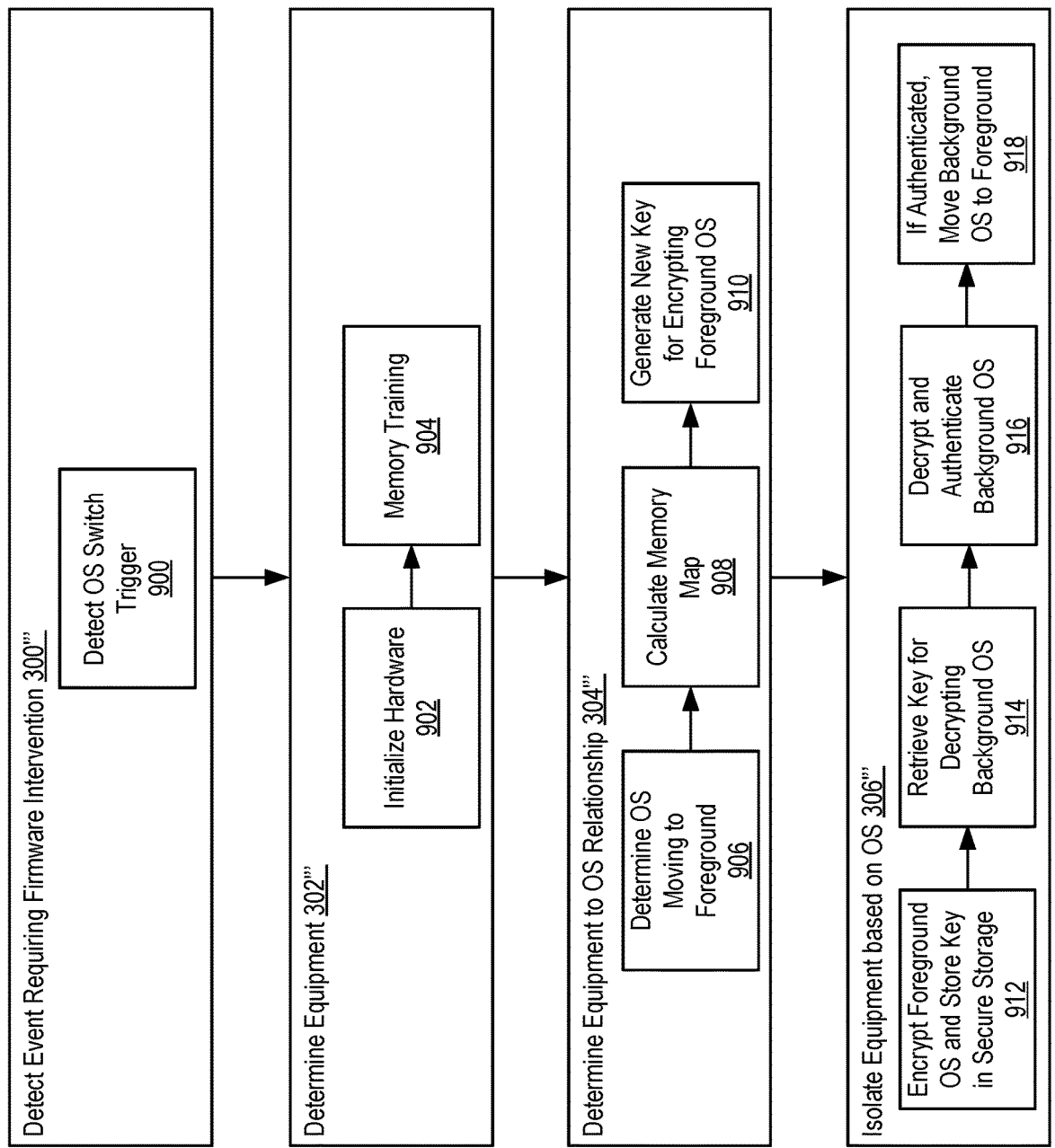
FIG. 9 illustrates example operations for equipment isolation via memory encryption in accordance with at least one embodiment of the present disclosure.

FIG. 9 illustrates example operations for equipment isolation via memory encryption in accordance with at least one embodiment of the present disclosure. Detecting an event requiring firmware intervention in operation 300''' may comprise, for example, detecting an OS switch trigger in operation 900. The examples of switch triggers discussed in regard to operation 700 in FIG. 7 are also applicable here. Determining the equipment in operation 302''' may comprise, for example, initializing the hardware (e.g., equipment 104) after resuming from the S3 sleep state in operation 902 followed by memory training to determine the current memory mapping in operation 904. Examples of operations 903 and 904 have been discussed previously in FIG. 7 in regard to operations 702 and 704, respectively. Similarly, determining the equipment to OS relationship in operation 304''' may comprise, for example, at least determining the OS moving to the foreground in operation 906 and calculating a memory map in operation 908, examples of which were discussed previously in FIG. 7 with respect to operations 706 and 708, respectively.

Operation 304''' may further comprise operation 910 wherein firmware 102 (e.g., AIM 108) may generate a new key for encrypting the area of memory used by foreground OS 106A. Isolating the equipment based on the OS transitioning to the foreground in operation 306''' may then comprise, for example, encrypting the area of memory utilized by foreground OS 106A in operation 912 using the key generated in operation 910 and then storing the key in secure storage (e.g., in SMRAM 804). In operation 914 the key that was previously utilized to encrypt the area of memory used by background OS 106B may be retrieved from the secure storage and may be employed to decrypt the area of memory used by background OS 106B in operation 916. In one embodiment, operation 916 may include authenticating the area of memory used by background OS 106B to ensure it has not been corrupted. If in operation 916 the contents of the area of memory used by background OS 106B cannot be authenticated, then the transition may fail and OS 106A may remain in the foreground. If authentication is successful, then in operation 918 background OS 106B may transition to the foreground and foreground OS 106A may move to the background.

While FIGS. 3, 5, 7 and 9 illustrate operations according to different embodiments, it is to be understood that not all of the operations depicted in FIGS. 3, 5, 7 and 9 are necessary for other embodiments. Indeed, it is fully contemplated herein that in other embodiments of the present disclosure, the operations depicted in FIGS. 3, 5, 7 and 9, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present application is directed to access isolation for multi-operating system devices. In general, a device may be configured using firmware to accommodate more than one operating system (OS) operating concurrently on the device or to transition from one OS to another. An access isolation module (AIM) in the firmware may determine a device equipment configuration and may partition the equipment for use by multiple operating systems. The AIM may disable OS-based equipment sensing and may allocate at least a portion of the equipment to each OS using customized tables. When transitioning between operating systems, the AIM may help to ensure that information from one OS is not accessible to others. For example, the AIM may detect when a foreground OS is to be replaced by a background OS, and may protect (e.g., lockout or encrypt) the files of the foreground OS prior to the background OS becoming active.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for access isolation for multi-operating system devices, as provided below.

According to example 1 there is provided a multi-operating system device. The device may comprise equipment to support operations in the device, at least two operating systems to interact with at least a portion of the equipment and firmware including at least an access isolation module to determine the portion of the equipment in the device that is accessible to each of the at least two operating systems.

Example 2 may comprise the elements of example 1, wherein the access isolation module being to determine the portion of the equipment comprises the access isolation module being to, following activation of the device, partition the equipment into portions accessible by the at least two operating systems.

Example 3 may comprise the elements of example 2, wherein the access isolation module being to determine the portion of the equipment comprises the access isolation module being to deactivate functionality in the firmware allowing the at least two operating systems to discover the equipment.

Example 4 may comprise the elements of example 3, wherein the access isolation module being to determine the portion of the equipment comprises the access isolation module being to generate tables corresponding to each of the at least two operating systems, the tables including at least the identification of a portion of the equipment accessible to each of the at least two operating systems following activation of the device.

Example 5 may comprise the elements of example 3, wherein the at least two operating systems are to load into the device and operate concurrently utilizing the portions of the equipment identified by the tables.

Example 6 may comprise the elements of any of examples 1 to 5, wherein equipment comprises at least a memory module including memory in which data corresponding to the at least two operating systems is stored.

Example 7 may comprise the elements of example 6, wherein the at least two operating systems comprise a foreground operating system and a background operating system, the access isolation module being further to detect a trigger to transition from the foreground operating system to the background operating system.

Example 8 may comprise the elements of example 7, wherein the access isolation module is further to, upon detecting the trigger, determine a portion of the memory utilized by the foreground operating system and to make the portion of memory determined to be utilized by the foreground operating system inaccessible to the background operating system.

Example 9 may comprise the elements of example 8 wherein the access isolation module being to make the portion of memory determined to be utilized by the foreground operating system inaccessible to the background operating system comprise the access isolation module being to at least one of adjust or lock down memory controller register settings to prevent access to the portion of memory.

Example 10 may comprise the elements of example 8 wherein the access isolation module being to make the portion of memory determined to be utilized by the foreground operating system inaccessible to the background operating system comprise the access isolation module being to generate an encryption key, use the key to encrypt the portion of memory utilized by the foreground operating system and to store the key in a secure memory in the equipment.

Example 11 may comprise the elements of example 10, wherein the access isolation module is further to obtain a second encryption key from the secure memory, use the second key to decrypt a portion of memory utilized by the background operating system and cause the foreground operating system to be replaced by the background operating system.

Example 12 may comprise the elements of any of examples 1 to 5, wherein the access isolation module being to determine the portion of the equipment comprises the access isolation module being to, following activation of the device, partition the equipment into portions accessible by the at least two operating systems, deactivate functionality in the firmware allowing the at least two operating systems to discover the equipment and generate tables corresponding to each of the at least two operating systems, the tables including at least the identification of a portion of the equipment accessible to each of the at least two operating systems following activation of the device.

Example 13 may comprise the elements of example 12, wherein the at least two operating systems are to load into the device and operate concurrently utilizing the portions of the equipment identified by the tables.

Example 14 may comprise the elements of example 1, wherein equipment comprises at least a memory module including memory in which data corresponding to the at least two operating systems is stored.

Example 15 may comprise the elements of example 14, wherein the at least two operating systems comprise a foreground operating system and a background operating system, the access isolation module being further to detect a trigger to transition from the foreground operating system to the background operating system.

Example 16 may comprise the elements of example 15, wherein the access isolation module is further to, upon detecting the trigger, determine a portion of the memory utilized by the foreground operating system and to make the portion of memory determined to be utilized by the foreground operating system inaccessible to the background operating system by at least one of at least one of adjusting or locking down memory controller register settings to prevent access to the portion of memory or generating an encryption key, using the key to encrypt the portion of memory utilized by the foreground operating system and storing the key in a secure memory in the equipment.

According to example 17 there is provided a method for accommodating multiple operating systems on a device. The method may comprise detecting an event requiring firmware intervention in a device, determining equipment existing in the device, determining a relationship between the equipment and at least two operating systems existing in the device and isolating at least a portion of the equipment for use by each of the at least two operating systems.

Example 18 may comprise the elements of example 17, wherein detecting the event comprises at least one of detecting activation of the device or a trigger to transition from a foreground operating system to a background operating system in the device.

Example 19 may comprise the elements of example 18, wherein determining the equipment in the device comprises partitioning the equipment into portions accessible by the at least two operating systems.

Example 20 may comprise the elements of example 19, wherein determining a relationship between the equipment and at least two operating systems comprises deactivating functionality in the firmware allowing the at least two operating systems to discover the equipment and generating tables corresponding to each of the at least two operating systems, the tables including at least the identification of a portion of the equipment accessible by each of the at least two operating systems following activation of the device.

Example 21 may comprise the elements of example 20, wherein isolating at least a portion of the equipment for use by each of the at least two operating systems comprises allowing the at least two operating systems to load into the device and operate concurrently utilizing portions of the equipment identified by the tables.

Example 22 may comprise the elements of any of examples 18 to 21, wherein determining a relationship between the equipment and at least two operating systems comprises determining a portion of the memory utilized by at least the foreground operating system. Example 23 may comprise the elements of example 22, wherein isolating at least a portion of the equipment for use by each of the at least two operating systems comprises, prior to the transition, making the portion of the memory utilized by at least the foreground operating system inaccessible to the background operating system by at least one of adjusting or locking down memory controller register settings, or by encrypting the portion of memory utilized by the foreground operating system.

According to example 24 there is provided a chipset arranged to perform the method of any of the above examples 17 to 23.

According to example 25 there is provided a system including at least a device, the system being arranged to perform the method of any of the above examples 17 to 23.

According to example 26 there is provided a device configured for access isolation for multi-operating system devices, the device being arranged to perform the method of any of the above examples 17 to 23.

According to example 27 there is provided at least one machine-readable storage medium having stored thereon, individually or in combination, instructions that when executed by one or more processors result in the following operations for accommodating multiple operating systems on a device comprising detecting an event requiring firmware intervention in a device, determining equipment existing in the device, determining a relationship between the equipment and at least two operating systems existing in the device and isolating at least a portion of the equipment for use by each of the at least two operating systems.

Example 28 may comprise the elements of example 27, wherein detecting the event comprises at least one of detecting activation of the device or a trigger to transition from a foreground operating system to a background operating system in the device.

Example 29 may comprise the elements of example 28, wherein determining the equipment in the device comprises partitioning the equipment into portions accessible by the at least two operating systems.

Example 30 may comprise the elements of example 29, wherein determining a relationship between the equipment and at least two operating systems comprises deactivating functionality in the firmware allowing the at least two operating systems to discover the equipment and generating tables corresponding to each of the at least two operating systems, the tables including at least the identification of a portion of the equipment accessible by each of the at least two operating systems following activation of the device.

Example 31 may comprise the elements of example 30, wherein isolating at least a portion of the equipment for use by each of the at least two operating systems comprises allowing the at least two operating systems to load into the device and operate concurrently utilizing portions of the equipment identified by the tables.

Example 32 may comprise the elements of any of examples 28 to 31, wherein determining a relationship between the equipment and at least two operating systems comprises determining a portion of the memory utilized by at least the foreground operating system.

Example 33 may comprise the elements of example 32, wherein isolating at least a portion of the equipment for use by each of the at least two operating systems comprises, prior to the transition, making the portion of the memory utilized by at least the foreground operating system inaccessible to the background operating system by at least one of adjusting or locking down memory controller register settings, or by encrypting the portion of memory utilized by the foreground operating system.

According to example 34 there is provided a system for accommodating multiple operating systems on a device, comprising means for detecting an event requiring firmware intervention in a device, means for determining equipment existing in the device, means for determining a relationship between the equipment and at least two operating systems existing in the device and means for isolating at least a portion of the equipment for use by each of the at least two operating systems.

Example 35 may comprise the elements of example 34, wherein the means for detecting the event comprise means for at least one of detecting activation of the device or a trigger to transition from a foreground operating system to a background operating system in the device.

Example 36 may comprise the elements of example 35, wherein the means for determining the equipment in the device comprise means for partitioning the equipment into portions accessible by the at least two operating systems.

Example 37 may comprise the elements of example 36, wherein the means for determining a relationship between the equipment and at least two operating systems comprise means for deactivating functionality in the firmware allowing the at least two operating systems to discover the equipment and means for generating tables corresponding to each of the at least two operating systems, the tables including at least the identification of a portion of the equipment accessible by each of the at least two operating systems following activation of the device.

Example 38 may comprise the elements of example 37, wherein the means for isolating at least a portion of the equipment for use by each of the at least two operating systems comprise means for allowing the at least two operating systems to load into the device and operate concurrently utilizing portions of the equipment identified by the tables.

Example 39 may comprise the elements of any of examples 35 to 38, wherein the means for determining a relationship between the equipment and at least two operating systems comprise means for determining a portion of the memory utilized by at least the foreground operating system.

Example 40 may comprise the elements of example 39, wherein the means for isolating at least a portion of the equipment for use by each of the at least two operating systems comprise means for, prior to the transition, making the portion of the memory utilized by at least the foreground operating system inaccessible to the background operating system by at least one of adjusting or locking down memory controller register settings, or by encrypting the portion of memory utilized by the foreground operating system.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
   one or more hardware devices;
   at least two operating systems; and
   firmware to:
      read setup options on a resources partition of the system;
      partition CPU resources in a description table;
      partition memory resources in a memory map;
      for each of the one or more devices:
         determine, based on one or more associations of each of the one or more hardware devices with the at least two operating systems, whether the respective hardware device has a relationship with the at least two operating systems; and
         declare as software-undiscoverable any of the one or more hardware devices determined to have a relationship with each of the at least two operating systems, including to disable a configuration space to prevent the at least two operating systems from being able to automatically discover the respective hardware device;
      isolate at least one of the one or more hardware devices for use by each of the at least two operating systems, including to generate one or more custom description tables for each of the at least two operating systems; and
      initiate a boot of the at least two operating systems using the one or more custom description tables generated for each operating system.

2. The system of claim 1, wherein the firmware is to, following an activation of the system, partition each of the one or more hardware devices into portions accessible by the at least two operating systems.

3. The system of claim 1, further comprising to assign I/O and/or memory-mapped I/O (MMIO) for at least one enumerated device of the one or more hardware devices to at least one base address register (BAR).

4. The system of claim 1, wherein to determine whether each of the one or more hardware devices has a relationship with the at least two operating systems is based on one or more prospective or reflective associations of the respective hardware device with the at least two operating systems.

5. The system of claim 1, wherein each of the one or more hardware devices include a peripheral component interconnect (PCI) device, and wherein to declare the respective hardware device as undiscoverable further includes to assign the PCI device as an Advanced Configuration and Power Interface (ACPI) device in a differentiated system description table (DSDT).

6. The system of claim 1, wherein the at least two operating systems are to concurrently utilize at least one device identified by the one or more custom description tables.

7. The system of claim 1, wherein the firmware is to partition the CPU resources in a fixed Advanced Configuration and Power Interface (ACPI) description table (FADT).

8. The system of claim 1, wherein the at least two operating systems comprise a foreground operating system and a background operating system, and wherein the firmware is further to detect a trigger to transition from the foreground operating system to the background operating system.

9. The device of claim 8, wherein the firmware is further to, responsive to detecting the trigger, determine a portion of the memory utilized by the foreground operating system and to make the determined portion of the memory utilized by the foreground operating system inaccessible to the background operating system.

10. The device of claim 9 wherein to make the determined portion of the memory utilized by the foreground operating system inaccessible to the background operating system includes to modify one or more memory controller register settings to prevent access to the determined portion of the memory utilized by the foreground operating system by the background operating system.

11. The device of claim 9 wherein the firmware is further to generate an encryption key, to use the key to encrypt the determined portion of the memory utilized by the foreground operating system, and to store the key in a secure memory.

12. The device of claim 11 wherein the firmware is further to obtain a second encryption key from the secure memory, to use the second key to decrypt the determined portion of the memory utilized by the foreground operating system, and to cause the foreground operating system to be replaced by the background operating system in the determined portion of the memory.

13. A method for accommodating multiple operating systems on a computing system that includes one or more hardware devices, comprising:
    reading, via firmware of the computing system, setup options from a resources partition of the computing system;
    partitioning, via the firmware, CPU resources in a description table;
    partitioning, via the firmware, memory resources in a memory map;
    for each of the one or more devices:
        determining, via the firmware and based on one or more associations of each of the one or more hardware devices with the multiple operating systems, whether the respective hardware device has a relationship with the multiple operating systems; and
        declaring as software-undiscoverable, via the firmware, any of the one or more hardware devices determined to have a relationship with each of the multiple operating systems, including by disabling a configuration space to prevent the multiple operating systems from being able to automatically discover the respective hardware device;
    isolating, via the firmware, at least one of the one or more hardware devices for use by each of the multiple operating systems, including by generating one or more custom description tables for each of the multiple operating systems; and
    initiating a boot, via the firmware, of the multiple operating systems using the one or more custom description tables generated for each operating system of the multiple operating systems.

14. The method of claim 13 further comprising, following an activation of the computing system, partitioning each of the one or more hardware devices into portions accessible by the multiple operating systems.

15. The method of claim 13, wherein the multiple operating systems comprise a foreground operating system and a background operating system, and wherein the method further comprises detecting a trigger to transition from the foreground operating system to the background operating system.

16. The method of claim 15 further comprising, responsive to detecting the trigger, determining a portion of memory utilized by the foreground operating system and making the determined portion of the memory utilized by the foreground operating system inaccessible to the background operating system.

17. The method of claim 16, wherein making the determined portion of the memory utilized by the foreground operating system inaccessible to the background operating system includes modifying one or more memory controller register settings to prevent access to the determined portion of the memory utilized by the foreground operating system by the background operating system.

18. The method of claim 16 further comprising generating an encryption key, using the key to encrypt the portion of the memory utilized by the foreground operating system, and storing the key in a secure memory.

19. The method of claim 18 further comprising obtaining a second encryption key from the secure memory, using the second key to decrypt the determined portion of the memory utilized by the foreground operating system, and causing the foreground operating system to be replaced by the background operating system in the determined portion of the memory.

20. At least one non-transitory machine-readable storage medium having stored thereon, individually or in combination, instructions that when executed by one or more processors of a computing system result in operations for accommodating multiple operating systems on the computing system, the operations comprising:
    reading setup options from a resources partition of the computing system;
    partitioning CPU resources in a description table;
    partitioning memory resources in a memory map;
    for each of one or more hardware devices:
        determining, based on one or more associations of each of the one or more hardware devices with the multiple operating systems, whether the respective hardware device has a relationship with the multiple operating systems; and
        declaring as software-undiscoverable any of the one or more hardware devices determined to have a relationship with each of the multiple operating systems, including by disabling a configuration space to prevent the multiple operating systems from being able to automatically discover the respective hardware device;

isolating at least one of the one or more hardware devices for use by each of the multiple operating systems, including by generating one or more custom description tables for each of the multiple operating systems; and initiating a boot of the multiple operating systems using the one or more custom description tables generated for each operating system of the multiple operating systems.

21. The storage medium of claim 20 wherein the operations further comprise, following an activation of the computing system, partitioning the one or more hardware devices into portions accessible by the multiple operating systems.

22. The storage medium of claim 20, wherein the multiple operating systems comprise a foreground operating system and a background operating system, and wherein the operations further comprise detecting a trigger to transition from the foreground operating system to the background operating system.

23. The storage medium of claim 22 wherein the operations further comprise, responsive to detecting the trigger, determining a portion of memory utilized by the foreground operating system and making the determined portion of the memory utilized by the foreground operating system inaccessible to the background operating system.

24. The storage medium of claim 23, wherein making the determined portion of memory utilized by the foreground operating system inaccessible to the background operating system includes modifying one or more memory controller register settings to prevent access to the determined portion of the memory utilized by the foreground operating system by the background operating system.

25. The storage medium of claim 22 wherein the operations further comprise generating an encryption key, using the key to encrypt the portion of the memory utilized by the foreground operating system, and storing the key in a secure memory.

26. The storage medium of claim 25 wherein the operations further comprise obtaining a second encryption key from the secure memory, using the second key to decrypt the determined portion of the memory utilized by the foreground operating system, and causing the foreground operating system to be replaced by the background operating system in the determined portion of the memory.

* * * * *